Dec. 27, 1949     J. M. GAYLORD     2,492,141
SUBMERSIBLE MOTOR
Filed March 26, 1945
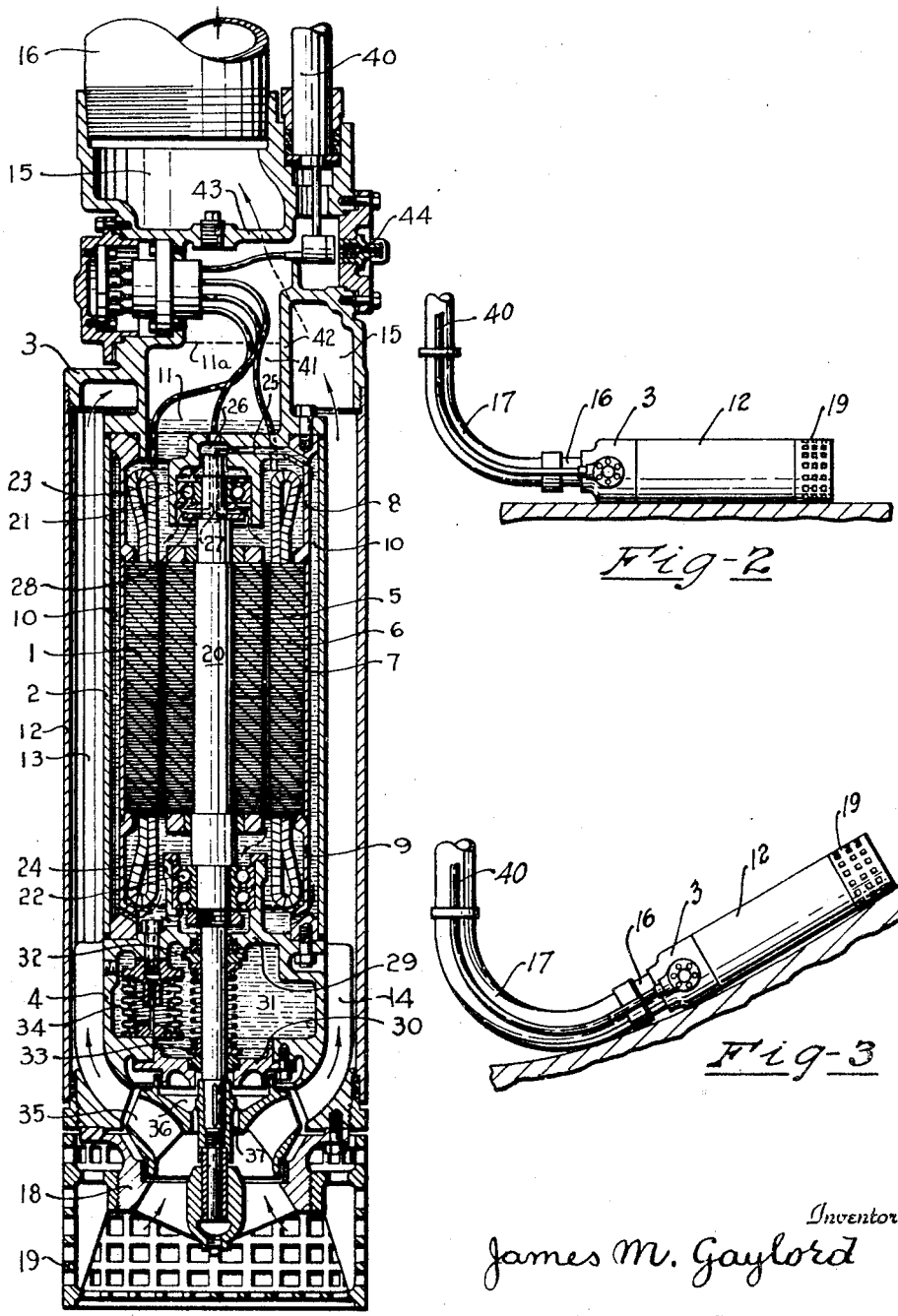
Inventor
James M. Gaylord
By Lyon & Lyon
Attorneys Patented Dec. 27, 1949

2,492,141

UNITED STATES PATENT OFFICE 2,492,141

SUBMERSIBLE MOTOR

James M. Gaylord, San Marino, Calif., assignor to Byron Jackson Co., Vernon, Calif., a corporation of Delaware Application March 26, 1945, Serial No. 584,972

11 Claims. (Cl. 172—36)

This invention relates to submersible motors and particularly to motors for use in portable or semi-portable submersible motor pump units especially adapted for emergency pumping service such as the unwatering of flooded ship compartments, mine workings, basements and the like, or the delivery of an emergency supply of water for fire fighting.

The foregoing and other pumping services of similar nature require a relatively light weight, compact motor pump unit which will operate in any position, whether vertical, horizontal or in any intermediate inclined position. Such a unit must necessarily be equipped with a minimum of accessories and conduits, in order to be capable of being quickly and readily manipulated into any desired operating position.

This invention constitutes an improvement over certain aspects of the invention disclosed and claimed in the copending application of Carl J. Blom, Serial No. 547,619, filed August 1, 1944, now abandoned, for Submersible motor, assigned to a common assignee. That application discloses several embodiments of a submersible electric motor having a motor compartment and a seal compartment, both containing a dielectric liquid, with the motor shaft extending through the seal compartment and being sealed by shaft seals of the so-called "mechanical seal" type. Means are provided for substantially equalizing the pressures in the motor compartment and the seal compartment, and in the various embodiments several alternative arrangements are provided for maintaining within those compartments a pressure which is slightly higher than the pressure to which the outer side of the outer shaft seal is subjected. As is well-known, mechanical seals are what may be termed "semi-effective" seals—that is, a very slight leakage occurs between the seal faces from the high pressure side to the low pressure side, and by maintaining a slightly higher internal pressure in the motor and seal compartments, any leakage will be outward leakage of the dielectric liquid rather than leakage of pump liquid inwardly to contaminate the dielectric liquid.

The present invention aims to provide a simpler arrangement for establishing and maintaining a slightly higher internal pressure, than is disclosed in the above-mentioned application. It has been determined from extensive tests that, contrary to established beliefs, an oil-immersed electric motor will function satisfactorily, without overheating, even though the oil circulation passages through and around the motor are not completely filled with oil. It is, therefore, feasible to provide a gas-filled space in the upper portion of the motor, in direct communication with the dielectric liquid. Such a gas-filled space serves the dual purpose of permitting thermal expansion of the dielectric liquid and of making it possible to subject the dielectric liquid to any desired pressure by pumping a gas into the space until the desired pressure is attained. By this arrangement, the motor is entirely self-contained and the only conduits required are the pump discharge conduit and the power cable for supplying electrical energy to the motor.

A principal object of this invention is to provide a self-contained submersible motor for a motor pump unit, having novel and improved means for maintaining the motor under predetermined internal pressure and for permitting thermal expansion of the dielectric liquid within the motor casing.

A further object of this invention is to provide a portable or semi-portable submersible motor pump unit which can be quickly and easily manipulated in confined quarters and which functions equally well in any position.

A still further object of this invention is to provide, in a submersible motor pump unit of the foregoing type, a construction which assures adequate lubrication of the rotor shaft bearings in any operating position which the unit may assume.

A more specific object of this invention is to provide a submersible motor in which the motor casing contains a body of dielectric liquid and a body of gaseous fluid in direct communication with each other, the gaseous fluid being free to seek its own level in any operating position of the motor.

Other objects and advantages will be apparent from the following detailed description of one embodiment of the invention, reference being had to the accompanying drawing wherein:

Fig. 1 is a central longitudinal sectional view of a submersible motor pump unit embodying the invention; and Figs. 2 and 3 are side elevations showing the unit in different operating positions.

Referring to Fig. 1 of the drawing, there is shown a motor pump unit which comprises generally an electric motor 1 encased in a fluid-tight housing consisting of a cylindrical shell 2, a top case 3 secured in fluid-tight relation to the upper end of the shell, and a combined seal chamber and pump impeller case 4 secured in fluid-tight relation to the lower end of the shell. The motor 1 includes the usual rotor and stator elements 5 and 6, the stator 6 being supported by a stator shell 7 and end rings 8 and 9 secured to opposite ends of the shell 7. The stator assembly is spaced inwardly from the motor shell 2 to provide an annular fluid passageway 10 for circulation of a liquid therethrough in heat exchange relation with the shell 2. As indicated in Fig. 1, the motor housing is filled with a liquid up to substantially the level indicated at 11, leaving a gas space thereabove for a reason to be presently described. This liquid performs three important functions. First, it serves as a heat transfer medium for transferring the heat developed in the motor through the shell 2 to the pump liquid flowing past the shell. Secondly, it serves as a lubricant for the rotor shaft bearings. Thirdly, it protects the electrical parts of the motor against ingress of the external liquid.

An outer discharge case 12 surrounds the motor shell 2 in spaced, concentric relation thereto to define an annular pump discharge passageway 13. At its lower end the passageway communicates with the discharge passages 14 in the impeller case 4, and at its upper end it communicates with a discharge passage 15 in the top case 3. A discharge conduit 16 is connected to the top case and, as shown in Figs. 2 and 3, may take the form of a short nipple connected to a flexible hose 17 which extends to a remote point of discharge of the pump liquid.

A bearing housing 18 is secured to the impeller case 4 and supports a strainer 19.

The rotor shaft 20 is supported adjacent its opposite ends in bearings 21 and 22, the latter being preferably of the combined radial and thrust type. The upper bearing 21 is supported within a downwardly depending sleeve 23 formed integral with the top case 3, while the lower bearing is supported in a cup-shaped extension 24 of the impeller case and seal compartment 4. It will be observed that a fluid passageway 25 extends transversely through the upper stator end ring 8 and the top case 3 from the annular circulation passage 10 to a central pocket 26 in the top case at the upper end of the shaft 20. The shaft is centrally bored at 27 for a short distance downwardly from its upper end, this bore terminating in one or more transverse ports communicating with radial pump passages in a pump impeller 28 secured to the shaft below the bearing 21. The motor liquid is circulated through the motor in the paths indicated by the arrows, it being observed that at least a portion of the liquid is circulated through the lower bearing 22.

The shaft 20 extends through the partitions 29 and 30 separating the seal chamber 31 from the motor compartment and from the pump chamber, respectively. The juncture of the shaft with these partitions is sealed by mechanical seals 32 and 33, the detailed construction of which is fully described in the above-mentioned copending application Ser. No. 547,617, now Patent No. 2,404,783, and forms no part of the present invention. The seal chamber 31 is also filled with the same liquid as is contained in the motor compartment, and substantial pressure equalization between the bodies of liquid in the two compartments is effected by a bellows structure 34 mounted in the seal compartment and having its interior exposed to the pressure in the motor compartment, all as described in the aforesaid copending application.

An impeller 35 is secured to the shaft 20 below the partition 30. It will be noted that a thrust balance chamber 36 is provided between the impeller and the partition 30, this chamber being vented to the suction eye of the impeller through ports 37. In this manner, the outer or lower side of the lower shaft seal 33 is subjected to substantially pump suction pressure when the pump is operating, and to the hydrostatic head at the depth of submergence if the unit is submerged when idle.

Electrical energy is supplied to the motor through a conductor cable 40, the individual conductors of which may be connected to the stator windings in any suitable manner. It will be observed that the electrical connections are mounted in an inner compartment 41 of the top case 3, which is separated from the pump discharge passage 15 by inner walls 42, 43.

As pointed out in the introductory remarks, it is very desirable to maintain a slightly higher pressure on the motor liquid than that to which the outer side of the lower shaft seal 33 is subjected, in order to assure that any leakage through the seal will be outward leakage of motor liquid rather than inward leakage of external liquid. This may be accomplished in various ways, several alternative arrangements being disclosed in the aforesaid copending application. In the present instance this is effected in an extremely simple and, surprisingly enough, highly effective manner. As previously stated, the motor compartment is filled with a dielectric and lubricating liquid to approximately the level indicated at 11. The remaining space in the inner compartment 41 of the top case 3 is then filled with either air or an inert gas such as nitrogen or carbon dioxide, under suitable superatmospheric pressure. The gas may be pumped into the chamber through a valve 44 until the desired pressure is attained. A normal pressure of from 15 to 30 pounds per square inch above atmospheric pressure has been found satisfactory for submergence conditions usually encountered.

During operation of the motor, the rise in temperature causes the oil to expand and, if the unit is operated in a vertical position, this will cause the oil level 11 to rise to a higher level such as that indicated by the dot-and-dash line 11a. The decrease in gas volume produces a corresponding increase in pressure, but it has been found that a 50% to 100% increase in pressure is not objectionable. The rate of outward leakage of motor liquid through the seal 33 is to some extent effected by the pressure differential across the seal, but within the range of 15 to 75 pounds per square inch pressure differential the rate of leakage is so slight that any variation therein is negligible. It has been found that very satisfactory results are attained if the volume of the body of gas, when the motor is idle, is from two to three times the thermal expansion of the dielectric liquid when the motor is running.

Motor pump units of the type described herein are, as previously stated, particularly adapted to emergency pumping service as salvage pumps on ships and marine installations, in mines, basements and other spaces subject to flooding. In this service it is frequently necessary to operate the unit in a horizontal position, as shown in Fig. 2, or even in an inclined position with the pump end at a higher elevation than the discharge end, as shown in Fig. 3. When this occurs, it is obvious that at least a portion of the gas which normally is confined in the compartment 41 is displaced into the motor compartment and tends to collect in the more elevated spaces and passageways therein. It has been found, however, that this occurrence has no appreciable effect on the operating characteristics of the motor. The forced circulation of the motor liquid through and around the motor carries some of the gas with it, and is effective to maintain the operating temperature within recommended limits.

The most serious drawback to only a partial filling of the motor compartment with liquid is the possible creation of a gas lock at the bearings, preventing proper circulation of the lubricant through the bearings. This is avoided by the construction described, inasmuch as any gas entering the bearing sleeves 23 and 24 is vented to a higher point or is forced out by the flow of lubricant. The bearing mountings and the lubricant circulation paths are so arranged that even if the unit were completely inverted both bearings would be adequately lubricated. It will also be noted that the pocket 26 in the top case at the upper end of the shaft is vented to the compartment 41, so that when the unit is returned to upright position after having been operated in a horizontal or inclined position, the gas may escape from the passageway 10 through the port 25 and the vent in the pocket 26. Any gas in the lower central portion of the motor may pass upwardly through the rotor gap and thence to the compartment 41.

From the foregoing description, it will be apparent that a very simple and yet effective means has been provided for subjecting the motor liquid to any desired pressure, and for permitting thermal expansion of the motor oil. No extra parts, such as pressure equalizing and expansion chambers, bellows or the like, are required to attain these results. The volume of gas and the normal pressure to which it is subjected are subject to considerable variation in accordance with particular operating conditions. Other advantages will also be apparent to those skilled in this art.

Although I have shown and described the invention as applied to a particular motor pump construction, it is to be understood that this is solely by way of example, and that the novel features are susceptible of embodiment in motor pumps of various constructions and in motors for other uses.

I claim:

1. A portable submersible motor pump unit, comprising: a housing structure defining a motor compartment and a sealing compartment; a motor in said motor housing having a drive shaft extending out of said housing and through said sealing compartment; mechanical seal elements surrounding said shaft and isolating said sealing compartment from said motor compartment and from the exterior of said housing; and a pressure equalizing means adapted to eliminate pressure differential between said motor and sealing compartments, said sealing compartment being substantially filled with a dielectric liquid and said motor compartment being partially filled therewith, said motor compartment also containing a body of gas in open communication with said dielectric liquid.

2. A portable submersible motor pump unit, comprising: a housing structure defining a motor compartment and a sealing compartment; a motor in said motor housing having a drive shaft extending out of said housing and through said sealing compartment; mechanical seal elements surrounding said shaft and isolating said sealing compartment from said motor compartment and from the exterior of said housing; and a pressure equalizing means adapted to eliminate pressure differential between said motor and sealing compartments, said sealing compartment being substantially filled with a dielectric liquid and said motor compartment being partially filled therewith, said motor compartment also containing a body of gas in open communication with said dielectric liquid, said housing structure being disposable in various operating positions between the vertical and the horizontal, and said body of gas being free to flow to the uppermost portions of said motor compartment in various operating positions.

3. A portable or semiportable submersible pump unit, comprising: a housing structure defining a motor compartment and a sealing compartment; a motor in said motor housing, said motor having a drive shaft extending out of said housing and through said sealing compartment; mechanical seal elements surrounding said shaft and isolating said sealing compartment from said motor compartment and from the exterior of said housing, said sealing compartment being substantially filled with a dielectric liquid and said motor compartment being partially filled therewith, said motor compartment also containing a body of gas in open communication with said dielectric liquid; and pressure equalizing means adapted to eliminate pressure differential between said motor and sealing compartments, said pressure equalizing means comprising a flexible partition having one side exposed to said motor compartment and having its other side exposed to said sealing compartment.

4. A portable or semiportable submersible pump unit, comprising: a housing structure defining a motor compartment; a motor in said compartment having a shaft extending therefrom out of said housing; mechanical seal elements surrounding said shaft and isolating said motor compartment from the exterior of said housing, said motor compartment being partially filled with a dielectric liquid and partially filled with a body of gas in open contact with said dielectric liquid; pumping means associated with said shaft within said motor compartment; and fluid circulation passages extending between the discharge and intake sides of said pumping means, said passages being adjacent said mechanical seal elements, whereby dielectric liquid is circulated by said pumping means past and about said mechanical seal elements.

5. A portable or semiportable submersible pump unit, comprising: a housing structure defining a motor compartment; a motor in said housing having a shaft extending therefrom out of said housing; mechanical seal elements surrounding said shaft and isolating said motor compartment from the exterior of said housing, said motor compartment being partially filled with a dielectric liquid and partially filled with a body of gas in excess of the external pressure against said mechanical seal elements; pumping means in said motor compartment associated with said shaft; and fluid circulation passages defined by said housing structure and said motor, said fluid circulation passages passing adjacent said mechanical seal elements whereby dielectric liquid circulated by said pumping means passes about and lubricates said mechanical seal elements.

6. A portable or semiportable submersible motor pump unit, comprising: a housing structure defining a motor compartment; a motor in said compartment having a motor shaft extending therefrom out of said motor compartment; bearing means in said housing structure for said shaft adjacent opposite ends of said motor; mechanical seal elements surrounding said shaft at one end of said motor and axially removed from one such bearing means and isolating said motor compartment from the exterior of said housing, said motor compartment being partially filled with a dielectric liquid and partially filled with a body of gas in open communication with said dielectric liquid; and a pumping means associated with said shaft at an end of said motor opposite from said mechanical seal elements and axially removed from the other of said bearing means, said housing structure and said motor defining circulation passages extending from the discharge side of said pumping means through one of said bearing means, through said motor, through the other of said bearing means, about said mechanical seal elements, and to the intake side of said pumping means.

7. A portable or semiportable submersible motor pump unit, comprising: a housing structure defining a motor compartment; a motor in said compartment having a motor shaft extending therefrom out of said motor compartment; bearing means in said housing structure for said shaft adjacent opposite ends of said motor; mechanical seal elements surrounding said shaft at one end of said motor and axially removed from one such bearing means and isolating said motor compartment from the exterior of said housing, said motor compartment being partially filled with a dielectric liquid and partially filled with a body of gas in open communication with said dielectric liquid; and a pumping means associated with said shaft at an end of said motor opposite from said mechanical seal elements and axially removed from the other of said bearing means, said housing structure and said motor defining circulation passages extending from the discharge side of said pumping means through one of said bearing means, through said motor, through the other of said bearing means, and to the intake side of said pumping means.

8. A portable or semiportable motor pump unit, comprising: a housing structure defining a motor compartment and a sealing compartment; a motor in said motor compartment having a drive shaft extending therefrom out of said housing through said sealing compartment; mechanical seal elements surrounding said shaft and isolating said sealing compartment from said motor compartment and the exterior of said housing structure, said sealing compartment being substantially filled with a dielectric liquid and said motor compartment being partially filled therewith, said motor compartment also containing a body of gas in open communication with said dielectric liquid; pressure equalizing means adapted to eliminate pressure differential between said motor and sealing compartments; and pumping means in said housing structure associated with said shaft, said motor and said housing structure defining communication passages leading from the discharge side of said pumping means adjacent the mechanical seal elements between said sealing compartment and said motor compartment and back to the intake side of said pumping means whereby dielectric liquid is circulated by said pumping means about said mechanical seal elements.

9. A portable or semiportable motor pump unit, comprising: a housing structure defining a motor compartment and a sealing compartment; a motor in said motor compartment having a drive shaft extending therefrom out of said housing through said sealing compartment; bearing means in said motor compartment for said shaft adjacent opposite ends of said motor; mechanical seal elements surrounding said shaft and isolating said sealing compartment from said motor compartment and the exterior of said housing structure, a set of said mechanical seal elements being at one end of said motor axially removed from one of said bearing means, and between said sealing compartment and said motor compartment, said sealing compartment being substantially filled with a dielectric liquid and said motor compartment being partially filled therewith, said motor compartment also containing a body of gas in open communication with said dielectric liquid; pressure equalizing means adapted to eliminate pressure differential between said motor and sealing compartments; and a pumping means associated with said shaft at an end of said motor opposite said mechanical seal elements and axially removed from the other of said bearing means, said housing structure and said motor defining dielectric liquid circulation passages extending from the discharge side of said pumping means through one of said bearing means, through said motor, through the other of said bearing means, about said mechanical seal elements, and to the intake side of said pumping means.

10. A portable or semiportable motor pump unit, comprising: a housing structure defining a motor compartment and a sealing compartment; a motor in said motor compartment having a drive shaft extending therefrom out of said housing through said sealing compartment; bearing means in said motor compartment for said shaft adjacent opposite ends of said motor; mechanical seal elements surrounding said shaft and isolating said sealing compartment from said motor compartment and the exterior of said housing structure, a set of said mechanical seal elements being at one end of said motor axially removed from one of said bearing means, and between said sealing compartment and said motor compartment, said sealing compartment being substantially filled with a dielectric liquid and said motor compartment being partially filled therewith, said motor compartment also containing a body of gas in open communication with said dielectric liquid; pressure equalizing means adapted to eliminate pressure differential between said motor and sealing compartments; and a pumping means associated with said shaft at an end of said motor opposite said mechanical seal elements and axially removed from the other of said bearing means, said housing structure and said motor defining dielectric liquid circulation passages extending from the discharge side of said pumping means through one of said bearing means, through said motor, through the other of said bearing means, and to the intake side of said pumping means.

11. A portable or semiportable motor pump unit, comprising: a housing structure defining a motor compartment and a sealing compartment; a motor in said motor compartment having a drive shaft extending therefrom out of said housing through said sealing compartment; bearing means in said motor compartment for said shaft adjacent opposite ends of said motor; mechanical seal elements surrounding said shaft and isolating said sealing compartment from said motor compartment and the exterior of said housing structure, a set of said mechanical seal elements being at one end of said motor axially removed from one of said bearing means, and between said sealing compartment and said motor compartment, said sealing compartment being substantially filled with a dielectric liquid and said motor compartment being partially filled therewith, said motor compartment also containing a body of gas in open communication with said dielectric liquid; pressure equalizing means adapted to eliminate pressure differential between said motor and sealing compartments, said pressure equalizing means comprising a flexible partition having one side exposed to said motor compartment and having its other side exposed to said sealing compartment; and a pumping means associated with said shaft at an end of said motor opposite said mechanical seal elements and axially removed from the other of said bearing means, said housing structure and said motor defining dielectric liquid circulation passages extending from the discharge side of said pumping means through one of said bearing means, through said motor, through the other of said bearing means, about said mechanical seal elements, and to the intake side of said pumping means.

JAMES M. GAYLORD.

REFERENCES CITED

The following references are of record in the file of this patent:

UNITED STATES PATENTS

| Number | Name | Date |
|---|---|---|
| 1,427,974 | Sessions | Sept. 5, 1922 |
| 1,428,238 | Keating | Sept. 5, 1922 |
| 1,736,002 | Frickey et al. | Nov. 19, 1929 |
| 2,002,913 | Mendenhall et al. | May 28, 1935 |
| 2,011,341 | Mendenhall et al. | Aug. 13, 1935 |
| 2,236,887 | Arutunoff | Apr. 1, 1941 |
| 2,243,208 | Hawley | May 27, 1941 |
| 2,291,248 | Myers | July 28, 1942 |
| 2,320,708 | Yost | June 1, 1943 |
| 2,404,783 | Blom | July 30, 1946 |

FOREIGN PATENTS

| Number | Country | Date |
|---|---|---|
| 266,828 | Italy | Aug. 13, 1929 |
| 691,059 | France | July 1, 1930 |